(12) United States Patent
Rai

(10) Patent No.: US 7,392,318 B1
(45) Date of Patent: Jun. 24, 2008

(54) METHOD AND SYSTEM FOR BALANCING A TRAFFIC LOAD IN A HALF-DUPLEX ENVIRONMENT

(75) Inventor: Piyush Rai, Uttar Pradesh (IN)

(73) Assignee: Novell, Inc., Provo, UT (US)

( * ) Notice: Subject to any disclaimer, the term of this patent is extended or adjusted under 35 U.S.C. 154(b) by 918 days.

(21) Appl. No.: 10/431,208

(22) Filed: May 7, 2003

Related U.S. Application Data (60) Provisional application No. 60/456,752, filed on Mar. 21, 2003.

(51) Int. Cl.
*G06F 15/16* (2006.01)
(52) U.S. Cl. .................. 709/230; 709/220; 709/223
(58) Field of Classification Search .......... 709/230, 709/220, 223
See application file for complete search history.

(56) References Cited

U.S. PATENT DOCUMENTS

| | | | |
|---|---|---|---|
| 6,078,960 A | 6/2000 | Ballard | |
| 6,178,160 B1 | 1/2001 | Bolton | |
| 6,185,601 B1 | 2/2001 | Wolff | |
| 6,243,360 B1 * | 6/2001 | Basilico | 370/231 |
| 6,259,705 B1 | 7/2001 | Takahashi et al. | |
| 6,401,121 B1 | 6/2002 | Yoshida et al. | |
| 6,539,445 B1 | 3/2003 | Krum | |
| 6,671,259 B1 * | 12/2003 | He et al. | 370/238 |
| 2001/0052016 A1 * | 12/2001 | Skene et al. | 709/226 |
| 2002/0138618 A1 * | 9/2002 | Szabo | 709/225 |
| 2003/0158940 A1 * | 8/2003 | Leigh | 709/226 |

* cited by examiner

*Primary Examiner*—John Follansbee
*Assistant Examiner*—Nghi V Tran
(74) *Attorney, Agent, or Firm*—Haynes and Boone, LLP (57) ABSTRACT

A method and system are provided for balancing a server's traffic load in an internet protocol (IP) based half-duplex network that uses an address resolution protocol (ARP) for address resolution. The server includes multiple network interface cards (NICS) that are used for communicating with multiple clients. The server may be accessible either directly to a client or indirectly to a client via a router or gateway. The clients, router, or gateway may store a single IP address identifying the server. The method comprises sending outbound traffic via some of the NICs and receiving inbound traffic via another of the NICs. To achieve this, the server is configured so that certain NICs are used only for outbound traffic and another NIC is used only for inbound traffic. This prevents a single NIC from both sending and receiving traffic, and minimizes the impact of inbound traffic on the server's overall throughput.

15 Claims, 5 Drawing Sheets

METHOD AND SYSTEM FOR BALANCING A TRAFFIC LOAD IN A HALF-DUPLEX ENVIRONMENT

CROSS REFERENCE

This application claims priority to U.S. Provisional Patent Application Ser. No. 60/456,752, filed on Mar. 21, 2003.

BACKGROUND

This disclosure relates generally to load balancing in digital systems and, more specifically, to a method and system for balancing a traffic load in a half-duplex environment when clients are across a router.

A computer network generally has at least one computer (e.g., a server or gateway) that provides services to other computers (clients) via the network. In an Internet Protocol (IP) network, the server and clients are associated with IP addresses that enable the other computers to send them packets. Address resolution between the server and clients may use an Address Resolution Protocol (ARP), which maps an IP address to a physical machine address. A device such as a router or gateway may be positioned in the network between the server and at least some of the clients to forward packets and perform similar functions.

The server generally has multiple network interface cards (NICS) or similar interfaces through which the incoming (inbound) and outgoing (outbound) traffic is routed. Each NIC may be associated with a unique hardware number called a Media Access Control (MAC) address (e.g., a physical machine address) that may be used in conjunction with the IP address to identify a specific communication route to be used when a client communicates with the server. If the server has multiple NICs and is communicating with clients on the same subnet (e.g., a portion of the network that shares a common address), the server may use a load balancing module to distribute the traffic between the NICs.

However, when the server is connected to the clients via the router in a half-duplex environment (e.g., an environment in which data is transmitted in just one direction at a time), the server's load balancing module may not be effective. For example, this ineffectiveness may be because the router may store a single MAC address for the server's IP address. As the router only has a single MAC address for the server, all inbound traffic is directed from the router to the server using the one NIC associated with the MAC address, even though the NIC is also used for outbound traffic. This creates congestion and lowers the throughput and efficiency of the server.

Therefore, what is needed is an improved method and system for balancing a server load in a half-duplex environment when the clients are across a router.

SUMMARY

In response to these and other problems, in one embodiment, a method and system is provided for balancing a traffic load on a server in a half-duplexed internet protocol (IP) based network that uses an address resolution protocol (ARP) for address resolution. The server includes at least first, second, and third network interface cards (NICS), and is accessible either directly to a client that stores a single IP address identifying the server or indirectly to a client via a router or gateway that stores a single IP address identifying the server. The method comprises sending outbound traffic via the first and second NICs, where the server is configured to only send traffic via the first and second NICs, and receiving inbound traffic via the third NIC, where the server is configured to only receive traffic via the third NIC. This minimizes an impact of the inbound traffic on the server.

DETAILED DESCRIPTION

This disclosure relates generally to load balancing in digital systems and, more specifically, to a method and system for balancing a traffic load in a half-duplex environment when clients are across a router. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
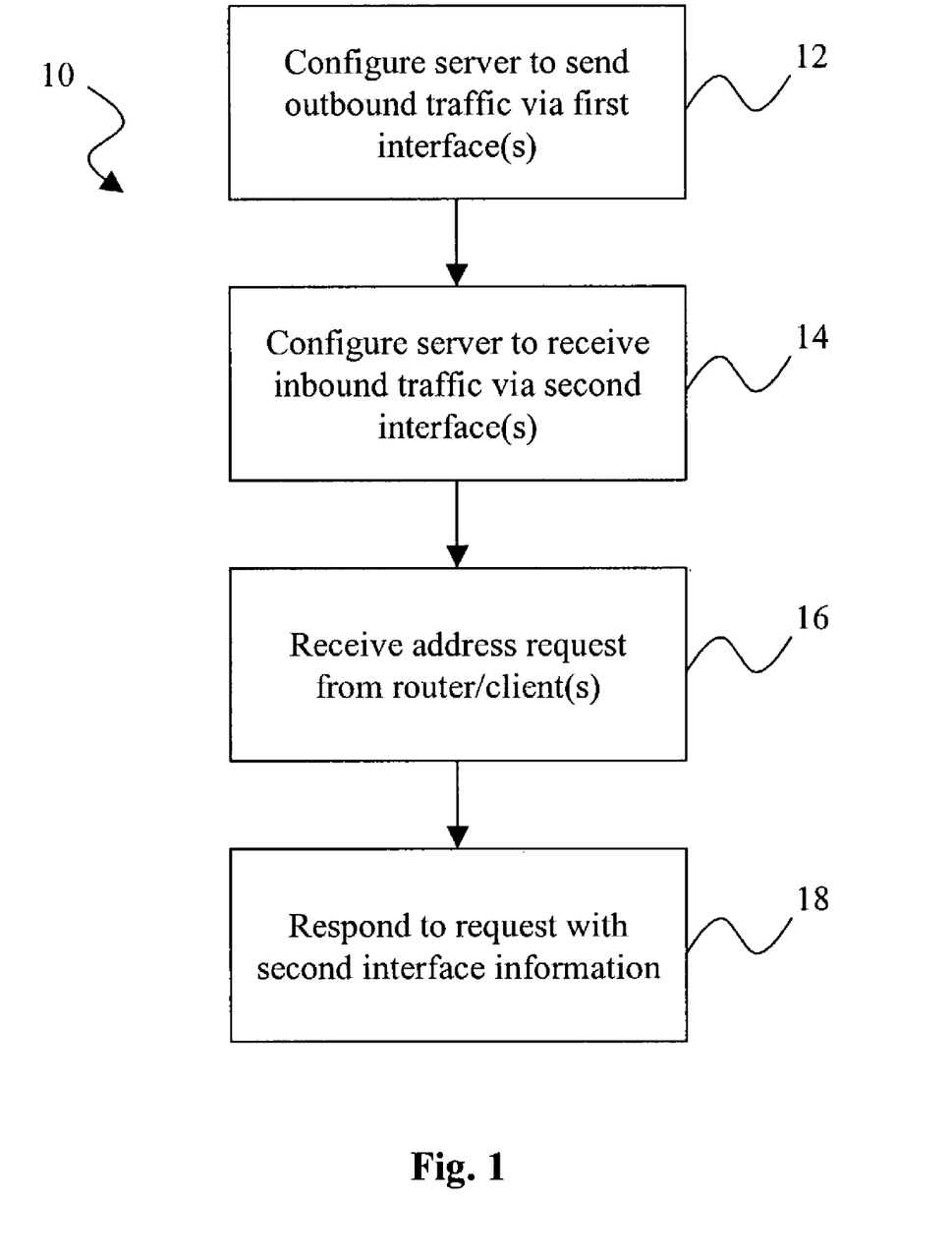
FIG. 1 is a flowchart illustrating a method for balancing a traffic load in a half-duplex environment when clients are across a router.

Referring to FIG. 1, in one embodiment, a method 10 enables a network computer, such as a server, to achieve and maintain a traffic load balance when connected to other computers (e.g., clients) through a router. The server and clients are each associated with an address, such as an internet protocol (IP) address, that enables the server and clients to communicate. As will be described later in greater detail, the server in the present example includes network interfaces that provide "links" to other computers. Each link provides a connection point or path to the server that may be used for traffic to and from a client. Because the present example is in a half-duplex environment, each link can only handle traffic in one direction (e.g., inbound or outbound) at a time.

The server also includes unique identifiers that are tied, for example, to hardware components (e.g., network interface cards (NICs)) that form at least a portion of the links. In the present example, the server has first and second interfaces that are each associated with a different identifier. The server distributes outbound traffic between the interfaces during load balancing. The load balancing may be accomplished using random methods that do not account for the traffic load on each interface, as such random methods generally provide a satisfactory distribution and are less processor intensive. Examples of such random methods include connection-based round robining, hashing, packet-based round robining, and random number generation.

The server and clients also have storage means (e.g., memory) for storing entries containing the address and identifier that is to be used to send messages to each computer. In the present example, an address resolution protocol (ARP) is used to resolve addresses among the server, router, and clients. Due to the implementation of ARP, the router may have only a single storage space (e.g., in an ARP table) in which to store the server's address information. Because of this, all traffic directed to the server by the router is directed to a single one of the server's two interfaces (e.g., the one that is associated with the IP address present in the router's ARP table). In the present example, this is the second interface.

However, due to the use of random load balancing methods that do not account for load on an interface, the server may not account for the additional load on the second interface caused by the inbound traffic. Generally, the overall throughput of the server depends on both inbound and outbound traffic, because inbound traffic includes transmission control protocol (TCP) acknowledgements, read/write requests, and similar processing and bandwidth needs. Accordingly, if the inbound traffic is not handled properly, the overall throughput (including the outbound traffic) will also suffer. Generally, the heavier the outbound traffic load, the worse the problem will be as the same bandwidth is being used for both inbound and outbound traffic on the first interface. Additional interfaces on the server may actually increase, rather than decrease, the congestion, as the additional interfaces may increase both the outbound and inbound traffic but do not relieve the inbound traffic load on the second interface.

The method 10 minimizes or avoids such congestion as follows. In step 12, the server is configured to send outbound traffic via the first interface. In step 14, the server is configured to receive inbound traffic via the second interface. This segregation of inbound and outbound traffic makes the entire bandwidth of the second interface available for inbound traffic. Furthermore, an application may send data more efficiently via the first interface, as it does not have to wait for the second interface to send data before the second interface can receive instructions meant for the application. In step 16, the server receives an address request from the router or another client and, in step 18, responds to the request with the identifier of the second interface. Accordingly, the inbound traffic may be directed through the second interface, which results in a higher server throughput and a more efficient utilization of bandwidth.

It is noted that other interfaces may be added to the server to provide additional bandwidth for outbound traffic. In this case, the outbound traffic may be balanced among the outbound interfaces using a random load balancing method or other desired balancing method. If more inbound bandwidth is needed, a higher bandwidth interface may be used to replace the second interface.

Figure 2:
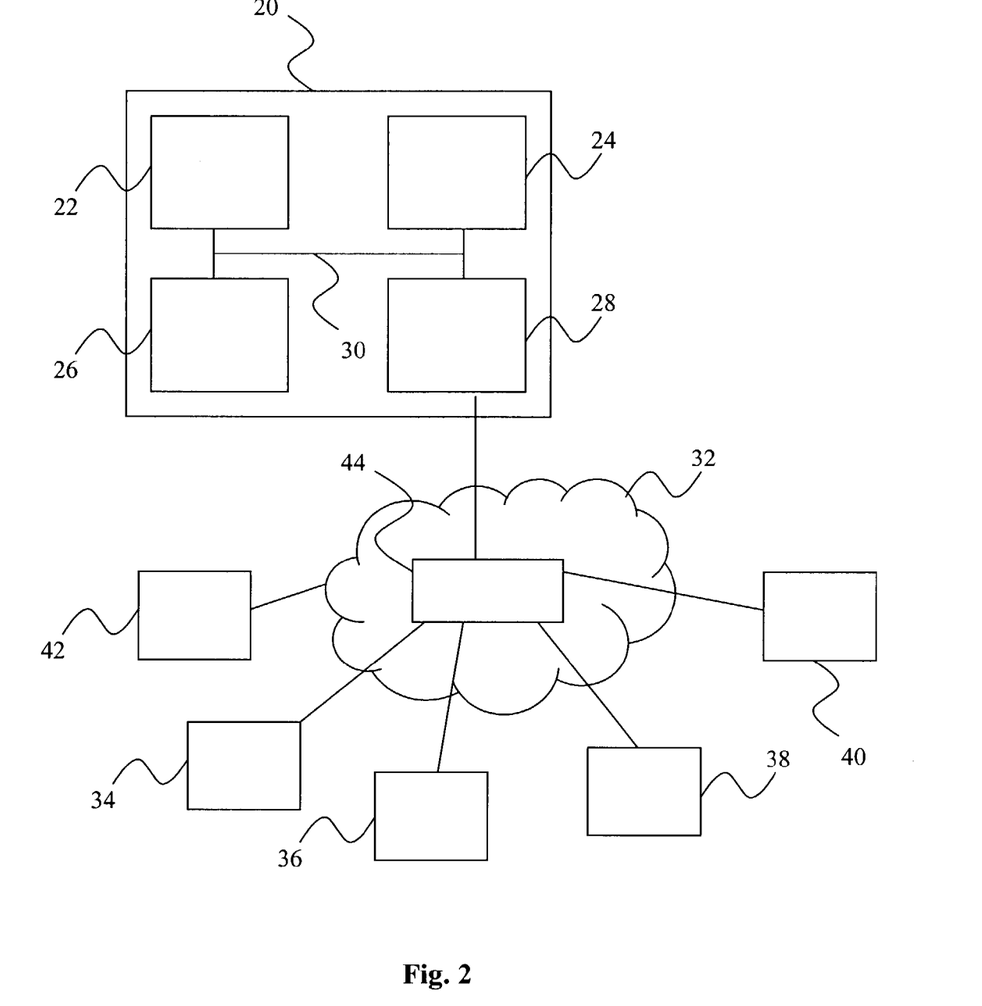
FIG. 2 is a diagram of an exemplary computer and network environment in which the method of FIG. 1 may be executed.

Referring now to FIG. 2, in another embodiment, an exemplary computer 20, such as may be used to implement the method 10 of FIG. 1, is illustrated. The computer 20 may include a central processing unit ("CPU") 22, a memory unit 24, an input/output ("I/O") device 26, and a network interface 28. The network interface may be, for example, one or more network interface cards (NICs) that are each associated with a media access control (MAC) address. The components 22, 24, 26, and 28 are interconnected by a bus system 30. It is understood that the computer may be differently configured and that each of the listed components may actually represent several different components. For example, the CPU 22 may actually represent a multi-processor or a distributed processing system; the memory unit 24 may include different levels of cache memory, main memory, hard disks, and remote storage locations; and the I/O device 26 may include monitors, keyboards, and the like.

The computer 20 may be connected to a network 32. The network 32 may be, for example, a subnet of a local area network, a company wide intranet, and/or the Internet. Because the computer 20 may be connected to the network 32, certain components may, at times, be shared with other computers 34, 36, 38, 40, 42. Therefore, a wide range of flexibility is anticipated in the configuration of the computer. Furthermore, it is understood that, in some implementations, the computer 20 may act as a server to other computers 34-42. Each computer 20, 34-42 is identified on the network by an address (e.g., an IP address) and, in some instances, by the MAC address associated with the network interface of the relevant computer. In the present example, the computers 20, 34-42 each have a table (e.g., an ARP table) that stores the IP address and MAC address of other computers. A router or gateway 44 may be positioned in the network 32 between the computer 20 and the computers 34-40.

Figure 3:
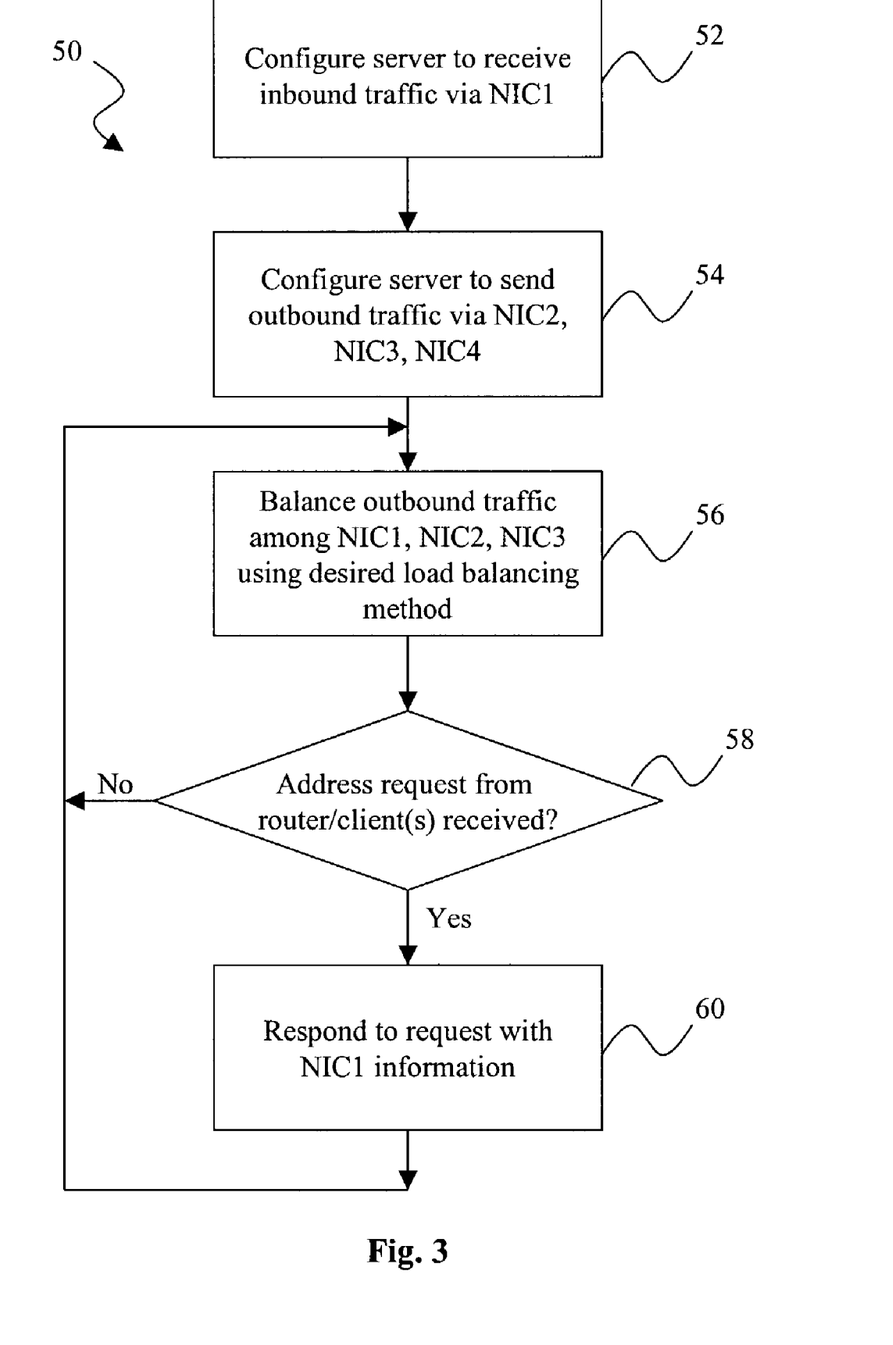
FIG. 3 is a flowchart illustrating another embodiment of a method for balancing a traffic load in the network of FIG. 2.
Figure 4:
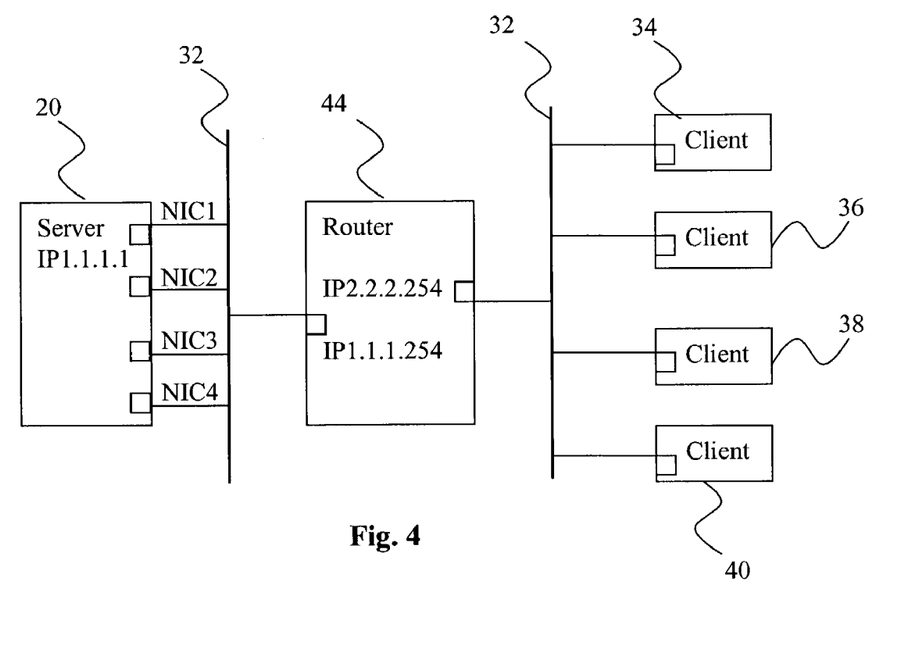
FIG. 4 illustrates another exemplary environment in which the method of FIG. 3 may be executed.

Referring now to both FIGS. 3 and 4, in still another embodiment, a method 50 aids in balancing a traffic load of the computer 20 of FIG. 2. In the present example, the computer 20 of FIG. 2 is illustrated as a server in the IP network 32 having connections with the computers 34, 36, 38, 40, 42. (It is noted that the computer 42 of FIG. 2 is referenced in the following text, but not shown in FIG. 4.) The server 20 has four NICs, which have MAC addresses NIC1, NIC2, NIC3, and NIC4. The server's IP address is 1.1.1.1. The computer 42 is located on the same portion of the network (e.g., subnet) as the server 20 and is a client of the server 20. The computers 34, 36, 38, 40 are connected through the router 44 to the computer 20 and are also clients of the server 20. The router 44 has multiple IP addresses 1.1.1.254 and 2.2.2.254. The IP address 1.1.1.254 serves the 1.0.0.0 network (which includes the server 20 and the client 42), while the IP address 2.2.2.254 serves the 2.0.0.0 network (which includes the clients 34, 36, 38, and 40). For purposes of illustration, the NICs of the router 44 have a bandwidth of 100 megabits per second (Mbps), while the server 20 and clients 34-40 have a NIC bandwidth of 10 Mbps. As stated previously, the environment is half duplex.

If a load balancing method, such as a round robin method, is enabled on the server 20 with each NIC able to send and receive, then the outbound traffic will be distributed among NIC1-NIC4. However, the router 44 can have only entry for the server 20 in the router's ARP table. For purposes of example, the entry is for NIC1 and the clients 34-40 are in communication with the server 20. Due to the load balancing method, the clients are distributed among NIC1-NIC4 so that client 34 is served by NIC1, client 36 by NIC2, client 38 by NIC3, and client 40 by NIC4. It is understood that other computers may be connected as well, so that another client may be served by NIC1 and so on.

However, because all the traffic generated by the clients for the server 20 is directed to NIC1 (due to its presence in the ARP table of the router 44), NIC1 will be more loaded than any other NIC on the server 20. This creates congestion as NIC1 attempts to send traffic assigned to it by the load balancing module and receive traffic from the router 44. An increase in outbound traffic will increase the amount of congestion, which will adversely affect both inbound and outbound traffic. This adverse effect is due to the TCP acknowledge messages, new connection requests, file read/write requests, and similar messages are all coming into NIC1. Furthermore, if packets are being dropped, inbound traffic cannot be switched to any of the other NICs.

Referring particularly to FIG. 3, the method 50 solves this problem by designating a specific NIC for inbound traffic only. To accomplish this, in step 52, the server 20 is configured to receive traffic only on NIC1. In step 54, the server 20 is configured to send traffic using only NIC2-NIC4. Accordingly, all inbound traffic directed to the IP address 1.1.1.1 will go through NIC1. In step 56, the server 20 performs load balancing of the outbound traffic on NIC2-NIC4. It is understood that the load balancing is an ongoing process and may be implemented in many different ways.

In step 58, the server 20 determines whether it has received an ARP request from the router 44 or the client 42. If no request has been received, the method 50 returns to step 56. If a request has been received, the method 50 proceeds to step 60, where the server responds to the request with NIC1. This directs all incoming traffic to NIC1 and enables the server 20 to better balance its traffic load.

Figure 5:
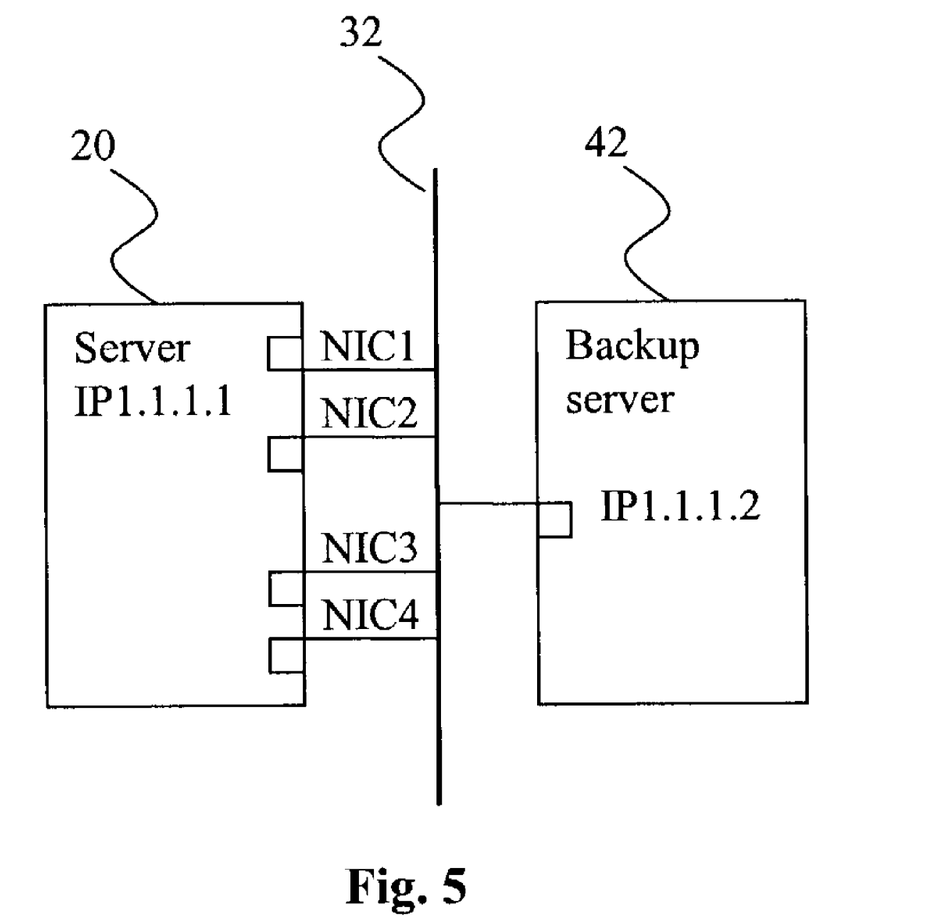
FIG. 5 illustrates still another exemplary environment in which the method of FIG. 3 may be executed.

Referring now to FIG. 5 and with continued reference to FIG. 3, in another embodiment, the method 50 of FIG. 3 may be used with in conjunction with a directly connected client 42 (FIG. 2). For purposes of illustration, the client 42 is a backup server having a relatively large bandwidth NIC, and the server 20 has a plurality of lesser bandwidth NICs identified as NIC1-NIC4. The load balancing method that is deployed is per packet based round robining (e.g., rotating through the interfaces so that the next packet is sent on the next interface), as this method uses all the NICs of the server 20 to send the packets. Many other load balancing methods are connection based (e.g., each NIC is associated with a different connection). Because of the packet based round robin load balancing method, all four NICs NIC1-NIC4 should have approximately the same outbound load. However, one of the NICs will have the entire inbound load because the backup server 42 has only one NIC entry for the server 20 in its ARP table. Accordingly, the overall traffic load of the server 20 will be unbalanced.

To explain this problem more specifically, the computer 20 of FIG. 2 is illustrated as a server in the IP network 32, which is a half-duplex environment. The server 20 has four NICs, which have MAC addresses identified as NIC1, NIC2, NIC3, and NIC4. The server 20's IP address is 1.1.1.1. The computer 42 is located on the same portion of the network (e.g., subnet) as the server 20 and is a client of the server 20. The backup server 42's IP address is 1.1.1.2. For purposes of illustration, the NICs of the server 20 have a bandwidth of 100 Mbps, while the backup server 42 has a NIC bandwidth of 1 gigabit per second (Gbps).

Because all the traffic generated by the backup server 42 for the server 20 is directed to NIC1 (due to its presence in the ARP table of the backup server 42), the NIC1 will be more loaded than any other NIC on the server 20. As described previously, an increase in outbound traffic will increase the amount of congestion, which will adversely affect both inbound and outbound traffic. This is due to the TCP acknowledge messages, new connection requests, file read/write requests, and similar messages that are coming into NIC1. Furthermore, if packets are being dropped, inbound traffic cannot be switched to any of the other NICs.

The method 50 solves this problem by designating a specific NIC for inbound traffic only. To accomplish this, in step 52, the server 20 is configured to receive traffic only on NIC1. In step 54, the server 20 is configured to send traffic using only NIC2-NIC4. Accordingly, the server 20 has only one IP address (1.1.1.1) for all the NICS, and the inbound traffic will be directed to NIC1. In step 56, the server 20 performs packet based round robin load balancing of the outbound traffic on NIC2-NIC4. It is understood that the load balancing is an ongoing process and that it may be implemented in many different ways.

In step 58, the server 20 determines whether it has received an ARP request from the backup server 42. If no request has been received, the method 50 returns to step 56. If a request has been received, the method 50 proceeds to step 60, where the server responds to the request with NIC1. This directs all incoming traffic to NIC1 and enables the server 20 to better balance its traffic load.

In another embodiment, a method provides an alternative load balancing solution that may be used in the half-duplex environments of FIGS. 4 and 5. The method begins with the assignment of a different address (e.g., an IP address) to each of the interfaces (e.g., NICs) of the computer 20. For example, using the previous designations for the server 20's NICs, NIC1 may be assigned the IP address 1.1.1.1, NIC 2 may be assigned 1.1.1.2, NIC3 may be assigned 1.1.1.3, and NIC4 may be assigned 1.1.1.4. All traffic to or from a client (e.g., the clients 34-42), uses a single one of the NICs.

It is understood that, because the server 20 can be reached by more than one IP address of the same network (e.g., 1.1.1.x) and clients may be using a domain name to reach the server (e.g., www.novell.com), a domain name system (DNS) server (not shown) may be used to resolve a name for one of the server's IP addresses (e.g., to lookup the 1.1.1.x IP address when given www.novell.com). In the present example, the DNS server may use its own load balancing method to select one of the IP addresses 1.1.1.1-1.1.1.4, as is known in the art. Accordingly, the traffic load on the server 20 may be balanced due to the use of different IP addresses with each NIC.

Other configurations may also be used. For example, if a client is contacting the server 20 using the server's domain name, the server's IP address may be manually configured in the client by placing the desired server IP address and server's name in a "host" file in the client. Alternatively, if the client machine is to contact the server 20 using the server's IP address, the client may use a specific address that has been allotted by an administrator. For example, an administrator may configure one group of clients to use 1.1.1.1. to reach the server 20, and may configure another group of clients to use 1.1.1.2 to reach the server 20.

While the preceding description shows and describes one or more embodiments, it will be understood by those skilled in the art that various changes in form and detail may be made therein without departing from the spirit and scope of the present disclosure. For example, the type of addressing used in the preceding description may vary, and it is understood that substitutions may be made. Similarly, different network configurations may be used for different types of digital devices. Furthermore, it is understood that multiple network addresses may be assigned to handle inbound and outbound communications, just as multiple hardware numbers may be assigned. Therefore, the claims should be interpreted in a broad manner, consistent with the present disclosure.

What is claimed is:

1. A method for balancing a traffic load on a server in a half-duplexed internet protocol (IP) based network that uses an address resolution protocol (ARP) for address resolution, wherein the server includes at least first, second, and third network interface cards (NICS), and wherein the server is accessible either directly to a client that stores a single IP address identifying the server or indirectly to a client via a router or gateway that stores a single IP address identifying the server, the method comprising:

sending outbound traffic only via the first and second NICs, wherein the server is configured to only send and to disallow receipt of traffic via the first and second NICs; and receiving inbound traffic only via the third NIC, wherein the server is configured to only receive and to disallow receipt of traffic via the third NIC, so that an impact of the inbound traffic on the server will be minimized.

2. The method of claim 1 further comprising balancing the outbound traffic between the first and second NICs.

3. The method of claim 1 wherein the balancing is accomplished using a random load balancing process that does not account for actual load on a given NIC.

4. The method of claim 3 wherein the random load process uses a packet-based methodology.

5. The method of claim 1 further comprising:
receiving an address request from the directly connected client, router or gateway; and
responding to the address request with an identifier associated with the third NIC, so that inbound traffic is directed to the third NIC.

6. A method for balancing a traffic load on a server in a network that uses an address resolution protocol (ARP) for address resolution, wherein the server includes at least first, second, and third data paths, and wherein the server is accessible either directly to a client or indirectly to a client via a router or gateway, the method comprising:
configuring the server to send outbound traffic to the clients only via the first data path and the third data path and to disallow outbound traffic from being sent to the clients via the second data path; and
configuring the server to receive inbound traffic from the clients only via the second path and to disallow inbound traffic from being received from the clients via the first data path and the third data path, wherein the first, second, and third data paths will not become congested as a result of both sending and receiving traffic via a single data path.

7. The method of claim 6 further comprising:
configuring the server to send outbound traffic to the clients via a third datapath and balancing the outbound traffic between the first and third data paths.

8. The method of claim 7 wherein the balancing includes sending packets to a single client using both the first and third data paths.

9. The method of claim 6 further comprising:
receiving an address request either directly from a client or indirectly from a client via the router or gateway; and
responding to the address request with an identifier associated with the second data path.

10. The method of claim 6 further comprising defining each of the first, second, and third data paths by a network interface card that is associated with a media access control address.

11. The method of claim 6 wherein the directly connected client, the router, and the gateway each store a single internet protocol address identifying the server, so that each must direct data to the server via the data path associated with the internet protocol address.

12. A system for maintaining a traffic load balance in a half-duplex environment, wherein the environment includes a server accessible to clients via a router or gateway, wherein the router or gateway stores a single network address for the server, system comprising:
a processor;
first, second, and third data interfaces for connecting the first processor to the clients; and
a memory accessible to the processor for storing instructions, the memory containing instructions for:
sending only outbound traffic to the clients via the first data interface and the third data interface; and
receiving only inbound traffic from the clients via the second data interface;
wherein outbound traffic to the clients is excluded from the second data interface and wherein inbound traffic from the clients is excluded from via the first data interface and the third data interface.

13. The system of claim 12 wherein the environment is an internet protocol (IP) based network, and the first, second, and third data interfaces are defined by first, second, and third network interface cards, respectively.

14. The system of claim 12 further comprising instructions for balancing the outbound traffic between the first and third data interfaces.

15. The system of claim 14 further comprising instructions for configuring the first and third interfaces for only sending traffic and configuring the second interface to only receive traffic.

* * * * *

UNITED STATES PATENT AND TRADEMARK OFFICE
CERTIFICATE OF CORRECTION

PATENT NO. : 7,392,318 B1 Page 1 of 1
APPLICATION NO. : 10/431208
DATED : June 24, 2008
INVENTOR(S) : Piyush Rai It is certified that error appears in the above-identified patent and that said Letters Patent is hereby corrected as shown below:

Column 7, Claim 7, should be corrected as follows:

FROM:

7. The method of claim 6 further comprising:
    configuring the server to send outbound traffic to the clients via a third datapath and balancing the outbound traffic between the first and third data paths.

TO:

7. The method of claim 6 further comprising:
    balancing the outbound traffic between the first and third data paths.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,392,318 B1 | Page 1 of 1 |
| APPLICATION NO. | : 10/431208 | |
| DATED | : June 24, 2008 | |
| INVENTOR(S) | : Piyush Rai | |

It is certified that error appears in the above-identified patent and that said Letters Patent is hereby corrected as shown below:

Column 7, Claim 7, lines 32-35, should be corrected as follows:

FROM:

7. The method of claim 6 further comprising:
configuring the server to send outbound traffic to the clients via a third datapath and balancing the outbound traffic between the first and third data paths.

TO:

7. The method of claim 6 further comprising:
balancing the outbound traffic between the first and third data paths.

This certificate supersedes the Certificate of Correction issued September 23, 2008.

Signed and Sealed this

Fourteenth Day of October, 2008

JON W. DUDAS
*Director of the United States Patent and Trademark Office*